July 28, 1964  H. F. TECHTMANN ET AL  3,142,608
BAG AND WRAPPER SEALING AND CUTOFF MECHANISM
Filed Aug. 22, 1960  4 Sheets-Sheet 1
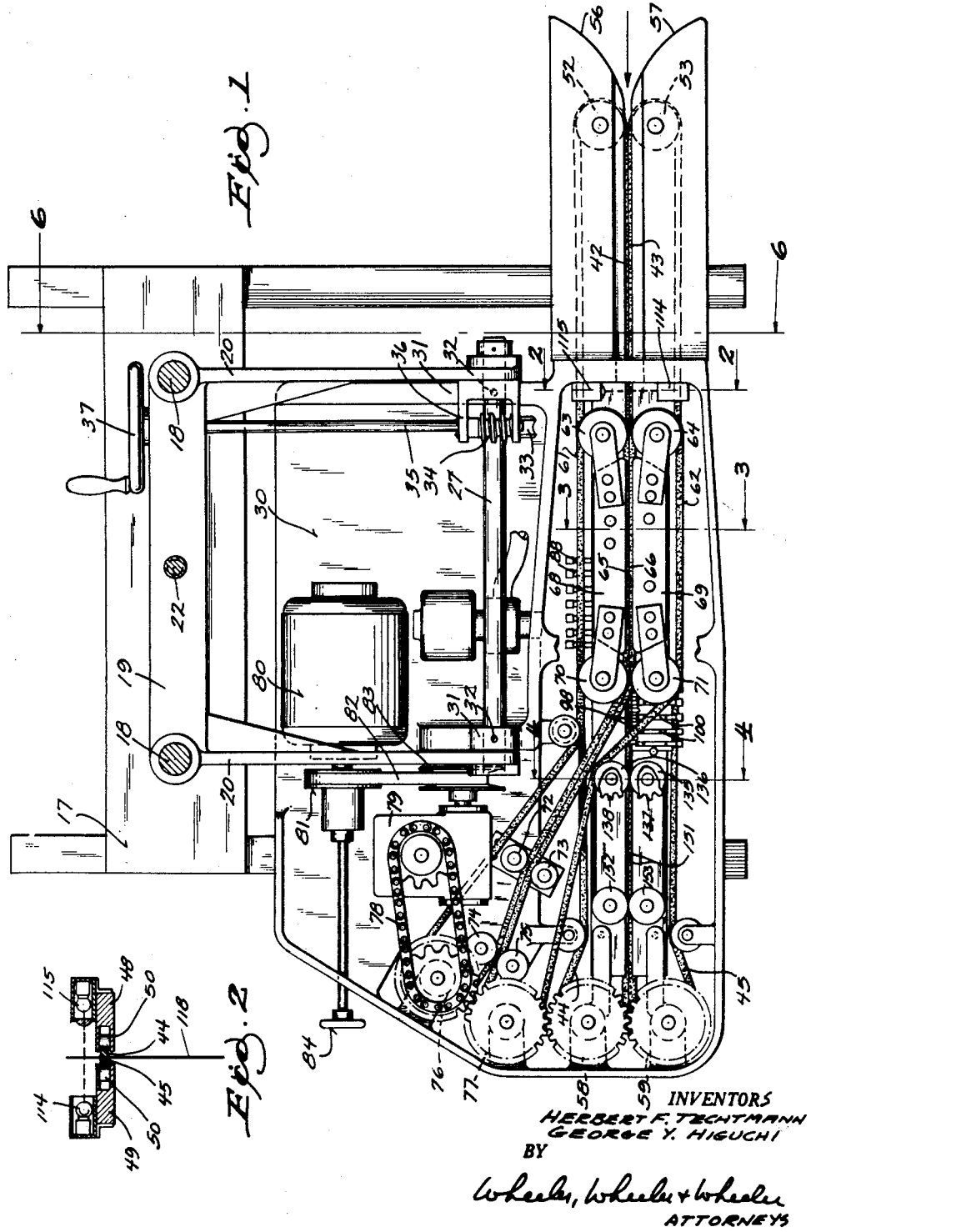
INVENTORS
HERBERT F. TECHTMANN
GEORGE Y. HIGUCHI
BY
Wheeler, Wheeler + Wheeler
ATTORNEYS

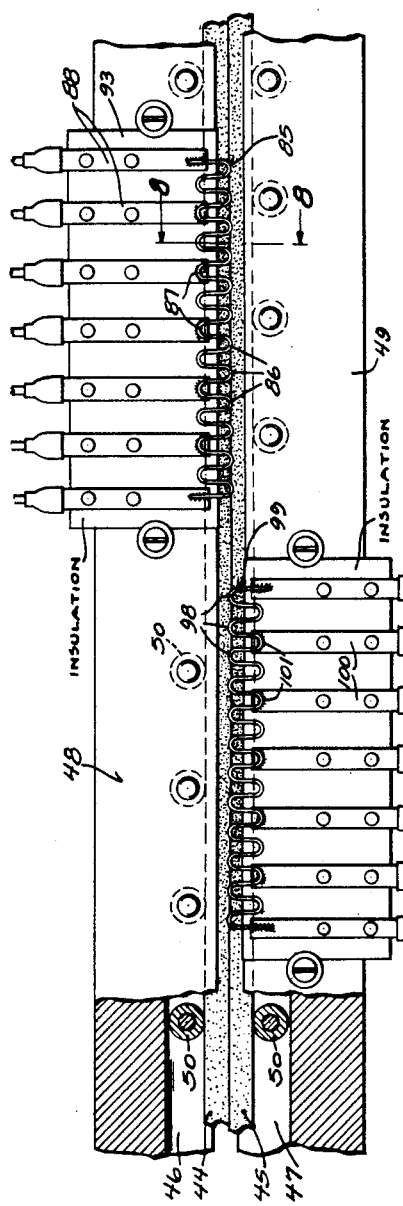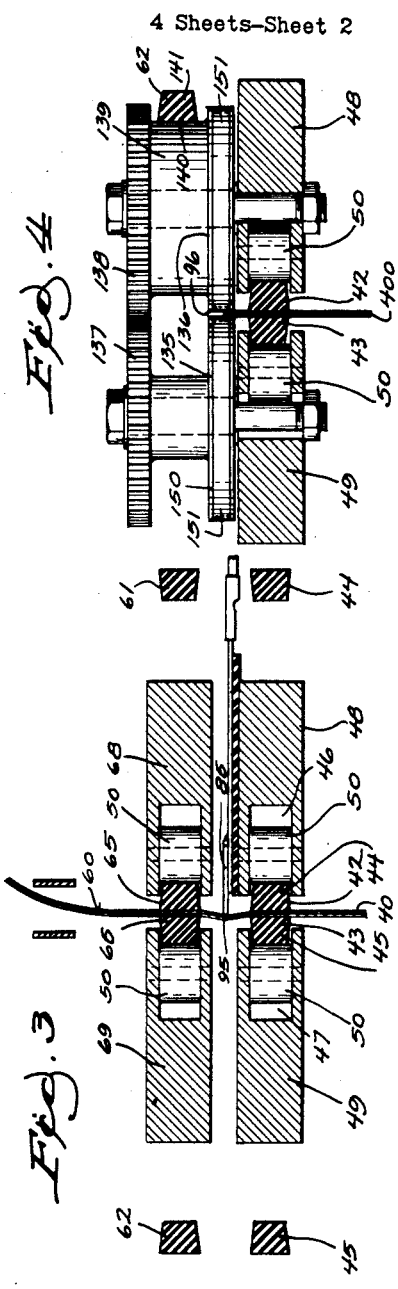

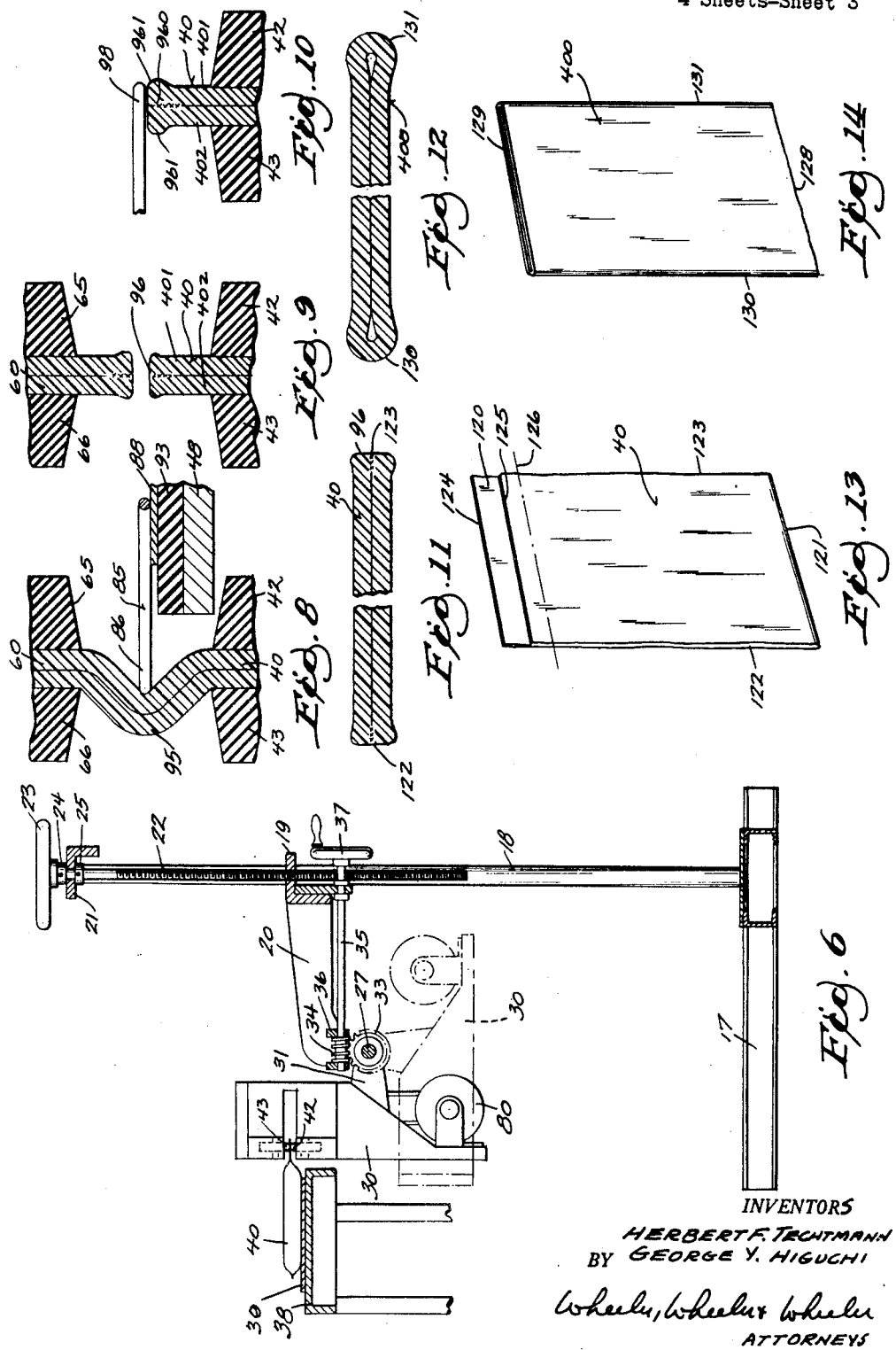

July 28, 1964  H. F. TECHTMANN ET AL  3,142,608
BAG AND WRAPPER SEALING AND CUTOFF MECHANISM
Filed Aug. 22, 1960  4 Sheets-Sheet 4
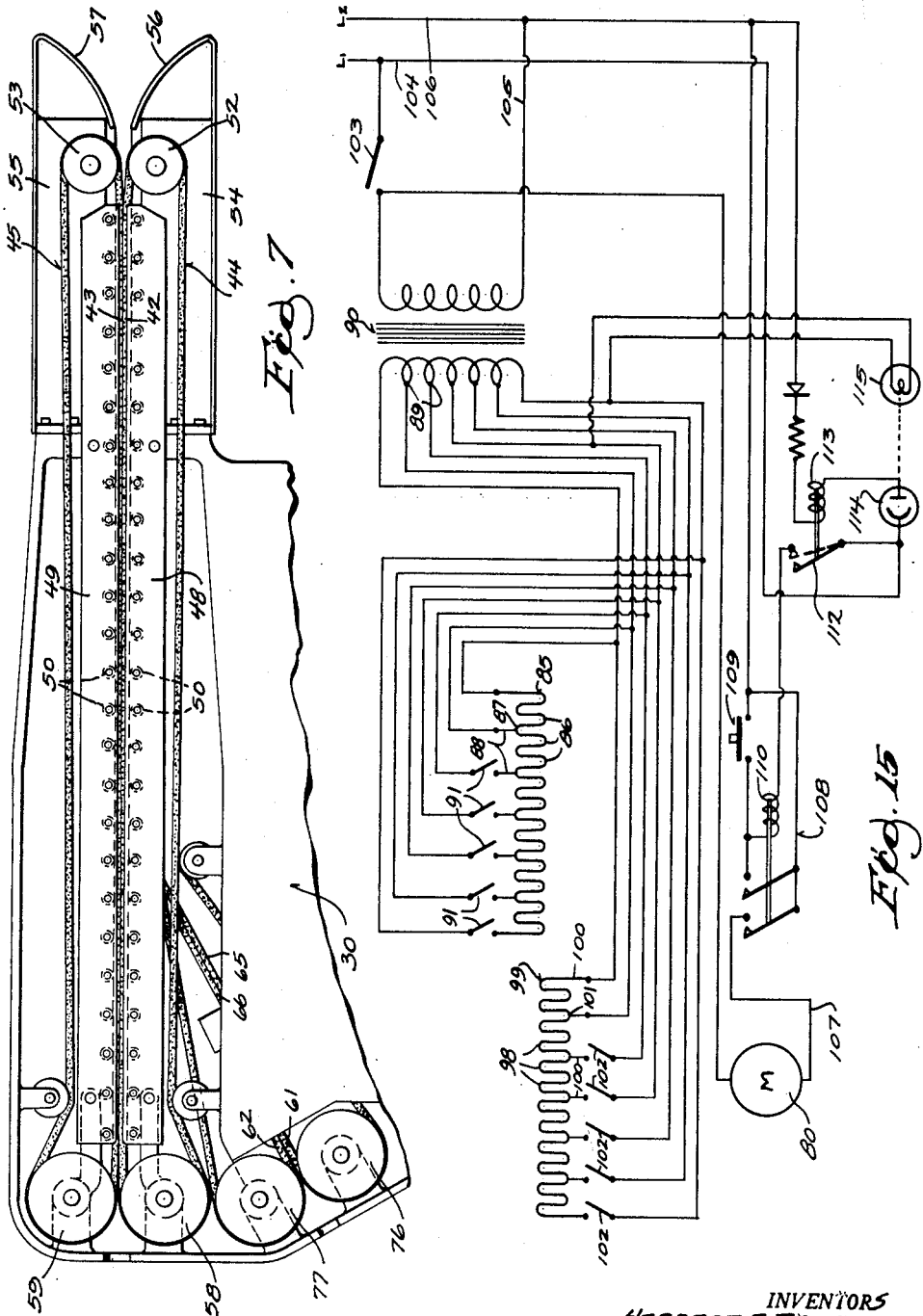
INVENTORS
HERBERT F. TECHTMANN
GEORGE Y. HIGUCHI
BY
Wheeler, Wheeler & Wheeler
ATTORNEYS

United States Patent Office 3,142,608
Patented July 28, 1964

3,142,608
BAG AND WRAPPER SEALING AND CUTOFF
MECHANISM
Herbert F. Techtmann and George Y. Higuchi, Milwaukee, Wis., assignors to Techtmann Industries, Inc., Milwaukee, Wis., a corporation of Wisconsin
Filed Aug. 22, 1960, Ser. No. 51,142
15 Claims. (Cl. 156—515)

This invention relates to bag and wrapper sealing and cutoff mechanism.

The invention is applicable to heat sealable and severable materials such as polyethylene or polypropylene. Product-filled tubes, bags or other wrappers are fed into the machine to be advanced by a pair of coacting feed belts which clamp the material adjacent the trim line. A second set of belts clamps waste material beyond the trim line. In the progressive movement of the packages with the material thereof thus clamped at spaced points, the material is severed between the two sets of clamping belts, a series of low mass heating elements such as resistance-heated loops desirably being used for severance. If additional sealing is required, this is desirably brought about through the supplemental action of additional low mass heating elements, followed, if necessary, by pressure rolls or coacting pressure belts for holding the softened material until it sets to effect the seal.

Meantime the clamping belts engaged with the severed waste are deflected to discharge the waste upon a different path from that on which the sealed packages are discharged.

The heating elements which do the cutting and sealing desirably comprise a series of elements spaced along the path of movement of the work to act successively thereon for raising temperature of the work in a series of increments until the desired severance or sealing temperature is reached. These elements have heat delivering portions substantially in point contact with the work, these being at sufficiently high temperature to burn off fused material which would otherwise accumulate thereon. Other portions serve as a heat reservoir for replenishing the heat of the low mass contact portions with sufficient rapidity to maintain these at optimum temperatures for the desired cutting or sealing, even in continuous operation.

The temperature is readily controlled either by varying the current or voltage or by reducing the number of energized elements. In addition, automatic controls are added to shut off the machine in the event that any opaque material enters between the clamping belts. This is important, since the preferred resistance wire loops are readily deformed if subjected to unusual pressure. However, particularly for severance, it is desirable that the heating elements be capable of exerting some tensioning pressure on the material, as well as delivering heat thereto.

Severance and seals across or in line with grain or molecular structure of low, medium or high density films are made with minimum shrinkage or reorientation. Low mass heated wire loops contacting film are of minimum diameter to present smallest contact consistent with structural strength. Films are cleanly severed and sealed with minimum impinging and smoking.

In the drawings:

FIG. 1 is a plan view of the apparatus embodying the invention, as it appears without any enclosing cover such as normally used in practice.

FIG. 2 is a detail view taken on line 2—2 of FIG. 1.

FIG. 3 is a detail view on an enlarged scale taken on line 3—3 of FIG. 1.

FIG. 4 is a detail view of FIG. 3 taken on the line 4—4 of FIG. 1.

FIG. 5 is an enlarged fragmentary detail view in plan showing portions of the heated wire loops and their electrical connection and the channel guides and V-belts overhung by the respective loops, the waste-conveying belts being omitted.

FIGS. 5A and 5B are fragmentary detail views showing possible modifications of the heating elements.

FIG. 6 is a view taken in section on a reduced scale on the line 6—6 of FIG. 1 showing the feed table adjusted to a different position from that of FIG. 1.

FIG. 7 is a detail view on the scale of FIG. 1 fragmentarily illustrating the table and feed conveyor mechanism in bottom plan.

FIG. 8 is an enlarged fragmentary detail view diagrammatically showing the operation of a cutoff loop upon the material of a work-enclosing tube or bag.

FIG. 9 is a fragmentary detail view showing the material as it appears following the operation illustrated in FIG. 8.

FIG. 10 is a fragmentary detail view showing the material as it appears following the operation of the supplemental sealing loops.

FIG. 11 is a diagrammatic plan view of the end of a workpiece trimmed and sealed by the steps portrayed in FIGS. 8 to 10.

FIG. 12 is a diagrammatic view in plan of the end of an unsealed workpiece of the type shown in FIG. 14.

FIG. 13 is a view in perspective showing a workpiece prior to the operation of the method and machine thereon.

FIG. 14 is a view in perspective showing an untrimmed and unsealed workpiece of the construction shown in plan in FIG. 12.

FIG. 15 is a circuit diagram.

The base 17 supports a pair of columns 18 upon which there is mounted for a vertical sliding adjustment a frame 19 which has forwardly projecting arms at 20. Connecting the tops of the columns 18 there is a cross member 21 in which there is rotatably mounted a screw 22 having hand wheel 23 and fixed against axial displacement respecting the cross member by means of collars 24, 25. This screw is threaded into frame 19 and the hand wheel 23 is thereby enabled to raise and lower the frame with respect to base 17.

The forward ends of the arms 20 are provided with bearings for a rock shaft 27 which pivotally supports the table 30. The table has ears at 31 pinned to the rock shaft 27 at 32. Carried by the rock shaft is a worm gear 33 actuated by worm 34 to oscillate the table. The worm 34 mounted on shaft 35 is journaled in a bracket 36 carried by one of the arms 20. A hand wheel 37 rotates shaft 35 to adjust the table between the full and dotted line positions shown in FIG. 6.

When the table is in the horizontal position shown in dotted lines in FIG. 6, and shown in full lines in FIG. 1, the workpieces hang from beneath the propelling and clamping belts hereinafter described. When the table 30 is in, or rotated toward, the position which is illustrated in full line position in FIG. 6, an auxiliary supporting means of the general type shown at 38, 39 is desirably used for workpiece 40 support during its advance through the mechanism. Since the operation of the mechanism is the same whether the workpiece is suspended or has supplemental support, as in FIG. 6, the description thereof will proceed on the basis of the showing in FIGS. 1–5 and 7–15.

Complementary clamping runs 42, 43 of conveyor belts 44, 45 are guided in the channels 46 and 47 of the bars 48 and 49 which extend longitudinally of table 30. Desirably, rollers 50 within the respective channels back up the belts.

At the inlet end of the machine shown at the right in FIGS. 1 and 7, the belts pass around the guide pulleys 52 and 53 carried by the arms 54 and 55, whereof the converging surfaces 56 and 57 guide the work into the clamping engagement of the respective belts. At the discharge end of the machine, the respective belts 44 and 45 pass around the pulleys 58 and 59.

The heat sealable material of the bags, tubes or other workpieces 40 will be engaged by the clamping runs 42 and 43 of conveyor belts 44 and 45 below the level at which the heat seal is to be effected. To facilitate filling and closing, there will ordinarily be a projecting length 60 of waste material which is to be severed from the workpiece 40. The waste-engaging belts 61 and 62 pass about pulleys 63 and 64 and have clamping runs 65 and 66 operating in the channels of guide bars 68 and 69 spaced from and in registry with the guide bars 48 and 49 in which the clamping runs 42, 43 of the workpiece conveying belts 44 and 45 operate. The pulleys 50 which back up the waste-clamping runs 65 and 66 are similar to those used to back up the work-clamping runs as above described (FIG. 3).

Just beyond the waste-severing means hereinafter to be described, the waste-clamping runs 65, 66 of conveyor belt 61, 62 are deflected by passing around pulley 70. A companion pulley 71 guides the return run of belt 62 at this point. Other guide pulleys are used at 72, 73, 74, 75 to lead the waste-clamping runs to the respective driving pulleys 76, 77. The arrangement is such that the severed waste leaves the apparatus on a different path from the path followed by the enclosed workpieces. The path of waste discharge is rearward when the table is horizontal and downward when the table is vertical.

The several belts are all operated at the same speed, this being desirable because of the fact that up to the time of severance the clamping runs of belts 44 and 45 are engaged with the workpieces and clamping runs of the belts 61, 62 are engaged with the waste portions, as yet unsevered from such workpieces. As best shown in FIG. 1, the several pulleys 76, 77, 58, 59 are all intergeared, pulley 76 being driven by a chain 78 from a speed reducer 79 which receives power from motor 80 through a variable speed drive pulley 81, belt 82 and pulley 83. A hand wheel 84 adjusts the pulley to regulate the speed of the belts.

Severance and/or sealing are accomplished by the sequential action of any desired number of low mass heating elements desirably provided with means providing a reservoir of heat which can be supplied thereto as required. It has been found important that the heating elements be as small in cross section as is reasonably possible, to minimize smoking and adhesion of the heat sealable material. It has been found particularly desirable to use as heating elements loops of resistance wire heated to a low red heat (approximately 1150° F.). The mounting ararngement and control of the resistance wire loops is important to the invention.

An electrical resistance wire 85 is convoluted as best shown in FIG. 5 to provide a series of loops 86. Support must be provided at frequent intervals but it has been found that it is unnecessary to support more than every other loop. Accordingly ends and alternate reverse loops 87 of the wire are supported by brazing or silver soldering to terminals 88.

As a convenient means of mounting the rearwardly extending loop portions 86 of the wrapper severing wire 85, the several terminals 88 may be fastened by riveting or otherwise to a sheet 93 of insulating material. This, in turn, may conveniently be mounted on guide bar 48. As shown in the wiring diagram, FIG. 15, the terminals are respectively connected with separate taps 89 of a transformer 90. By way of illustration, but not by way of limitation, it may be observed that in practice No. 18 nickel chromium (composition of 80% nickel and 20% chromium) wire of .040 cross section is used and receives about one and one-half volts across each pair of loops. The wire gives a dull red glow when in use to sever and seal the polyethylene jacket of a workpiece. For this particular composition of resistance wire, No. 18 gauge has been found important. If smaller wire is used, it has inadequate mechanical strength. If larger wire is used, there is an increase in smoking and sticking. The particulars are, of course, given by way of example, not by way of limitation.

Instead of using the wire loops, it is also possible to use other types of heating elements providing the desired minimum mass at and adjacent the point of contact with the work, while, at the same time, providing heat reservoir means. The device of FIG. 5A is a strip heater 92 having a heat seal blade 920 from which a succession of heating elements comprising the fingers 860 project to engage the work. Each of the heating elements 860 is of small cross section and has a blunted tip at 861 to engage the work to deliver heat thereto as in the case of the resistance wire loops. The blade 920 acts as a heat reservoir to supply heat as needed to the fingers 860 with sufficient rapidity to enable these to serve as successive heating elements for sealing or severing the material as desired.

The construction shown in FIG. 5B is a supporting bar 925 which supports the fingers 865, each of which has a heavy base at 866 serving as a heat reservoir and wound with individual heating elements 867. The reduced cross-section low-mass heating elements 868 project from the heat reservoir portions 866 of the several fingers and may be curved in the direction of workpiece movement as shown in FIG. 5B or may be straight as shown in FIG. 5A. It is, of course, understood that the fingers 860 shown in FIG. 5A may likewise be curved as in FIG. 5B.

Because the workpieces may comprise a variety of different jacket materials of differing thicknesses, it is desirable to control the temperature developed in the jacket materials supplied by the workpieces. This may be done by varying the temperature of the several heating elements as by varying the amount of current which heats the individual heating element but, in view of the fact that the overall heating effect is the result of the cumulative action of successive elements, it is also possible to control the temperature developed in the workpiece by varying the number of heating elements operating successively thereon. To this end, we provide the leads to successive terminals with independently operable switches as shown at 91 in the circuit diagram so that the cumulative heating effect of the several outward loops can be varied as desired by manipulating one or more of the switches. As aforesaid, it is desirable that each such loop constitute a heat reservoir whereof only a minor portion of its arcuate bend constitutes the actual heating element which delivers heat to the workpiece.

In any case, it is a desirable result of the method and apparatus herein disclosed that the very limited cross section of the heating element at the point where it contacts the work minimizes the shrinkage of the material acted on. Not only is the limited mass of the heating element a factor in this regard, in and of itself, but it permits the heating element to be located physically in immediate proximity to the supporting conveyor belts. This (inasmuch as they engage the workpieces immediately adjacent the point where the sealing and cutoff occur) is likewise a means of limiting shrinkage.

As the workpiece 40 approaches the cutoff device 85, it will be clamped below the cutoff point between the runs 42, 43 of belts 44, 45. The waste portions 60 will be clamped between the runs 65, 66 of the waste conveying belts 61, 62.

The first heating element such as outward loop 86 will deflect it to the side as indicated at 95 in FIG. 8. This view is, of course, greatly exaggerated due to the exaggerated showing of thickness of the mating plies at the mouth of the workpiece 40. Heat imparted in steps to the workpiece by point contact with the successive loops 86 or other heating elements of the cutoff device 85 will melt through the workpiece to sever the waste 60 as shown in FIG. 9, leaving the two plies 401 and 402 at least preliminarily fused together at 96. In fact, for many purposes, the fused connection of the two plies at the mouth of the workpiece will be sufficient.

However, if a more perfect hermetic seal is required, this is achieved by energizing such additional heating elements as the corresponding loops 98 of a sealing resistance wire 99 which is mounted and controlled by means of terminals 100 engaged with its ends and with its reverse loops 101 as clearly shown in FIGS. 5 and 15. As in the case of the severance heating elements at 85, the sealing wire 99 has its reverse loops separately controlled as to energization by switches shown at 102 in FIG. 15. The loops 98 may be supplied with current in parallel with loops 86 of the severance wire 85.

As will be evident from FIG. 10, the passage of a workpiece 40 through the sealing section will add increments of heat to cause any desired additional melting and fusing of the upper margins of the plies 401 and 402 to extend the fused area from the relatively small extent shown at 96 in FIG. 9 to the greater extent shown at 960 in FIG. 10. The fusing may be accompanied by some beading of the semi-molten material at 961, which will be an advantage in some instances.

A preferred circuit arrangement is shown in FIG. 15. A master switch 103 controls the supply of current from the line tap 104 to the transformer 90 and the motor 80. The return side of of the transformer primary is connected at 105 to the other side 106 of the line, but the return conductor 107 from the motor is connected to the return side 106 of the line only through a relay 108 which is manually energized by push button starting switch 109 and has a holding coil 110 which keeps the relay circuit to the motor closed as long as the holding coil continues to be energized.

The holding coil circuit includes a normally open switch 112 having a closing relay coil 113 energized only when the current flows through the photocell 114 when the later is excited by light from a lamp 115. As shown in FIGS. 1 and 2, the lamp 115 is at one side of the path of the workpieces clamped between the clamping runs 44 and 45 of the conveyor belts, while the electric eye or photocell 114 is at the other side. The arrangement is generally conventional and no claim to the specific circuitry is made. The photocell will receive sufficient light to hold the circuit of motor 80 closed unless an opaque object such as a piece of cardboard shown at 118 in FIG. 2 passes between the light and the photocell. Because such an object might damage the resistance wire loops 86 and 98, the interruption of the light beam results in breaking the holding circuit through coil 113 thereby allowing switch 112 to open to break the holding circuit to relay 110 and terminate immediately the operation of the motor 80.

With opaque or darker films, a microswitch arrangement may be used for protection of the heating elements. In this case the microswitch is placed in relatively the same position as the photocell, and its actuating lever is set to allow the films being sealed to pass into the unit with practically no clearance. Heavier thickness material, such as cardboard, will actuate the microswitch and open the motor switch circuit.

As an example of a workpiece upon which the device is adapted to operate, reference is made to FIG. 13 which shows a workpiece made by folding a strip 120 of heat sealable material transversely upon itself at 121, and heat sealing its side margins 122 and 123. The desired folding is uneven to leave one end margin 124 projecting beyond the other end margin 125 to facilitate filling the resulting bag. However, in sealing the bag, the projecting margins 124, 125 are regarded as waste and severance will be made approximately at the level indicated by broken line 126.

A special sealing problem is provided by the type of container workpiece shown at 400. This workpiece could be any backseam, side gussetted or seamless tube style bag. We have shown this as a piece of seamless tubing formed into a bag by heat sealing its lower end margins 128. The bag is then filled through its upper end 129. However, the side folds 130 and 131 tend to remain slightly open as shown in FIG. 12. Since the fusing operation described above and shown in FIGS. 8, 9 and 10 leaves the material somewhat soft momentarily, the resilience of the folds 130 and 131 may tend to spring these open unless the material is subjected to clamping pressure at the line of seal, which is slightly above the clamping runs 42, 43 of conveyor belts 44, 45. Accordingly, there is optionally provided a pair of pressure rolls 135, 136 connected by their respective gears 137, 138 to turn in unison. The connection between roll 136 and disk gear 138 is made through a pulley 139 driven by the back face 140 of the return run 141 of the waste conveyor belt 62. As shown in FIG. 4, the clamping rolls 135, 136 engage the fused marginal portions 96 of workpiece 400 and, at the same time, tend to abstract heat so as to set the material and perfect the seal. The pressure rolls are adjustably spaced at a separation only slightly less than the thickness of the plies which make up the mouth of the bag. To keep the rolls from adhering to the molten material of the bag plies, the rolls are desirably faced at 150 with Teflon applied thereto as a spray coating or by means of Teflon impregnated tape which may constitute pressure belts 151 guided about rolls 136 and 136 and idlers 152 and 153. As indicated, the use of this accessory is optional. It will not be needed for a workpiece of the type shown at 40 in FIG. 13 unless heavy thickness (over 2 mils) film is used, and will not always be needed for the type of workpiece shown at 400 in FIGS. 12 and 14.

When the apparatus is to be fed by hand, the table will ordinarily be horizontal as shown in FIGS. 1 and 8 to 10, the several workpieces being introduced between the convergent surfaces 56 and 57 of the arm extensions 52, 53 of the table. If the workpieces are to be fed in automatically, as on the belt 39, the table will preferably be rotated to the position in which it is shown in full lines in FIG. 6. The converging belt runs 56 and 57 may be extended to include a tapered entrance for the film for automatic feeding. However, the operation will remain unchanged. In either instance, the severing of the material will be, in effect, a melting operation involving progressive engagement of the area of severance under some pressure with successive low mass heating elements, the pressure engagement of such elements with the hot wire being repeated as often and at as great a temperature as may be necessary to sever the particular material of the workpiece.

In most instances, the mere severance by melting will also result in a fusion which will tend to seal the remaining end of the workpiece. However, this seal may be increased by additional melting produced by passage of the closed end of the workpiece beneath additional heated loops. Ordinarily there will be actual contact with the loops but such contact is not necessary because the material will already be hot as a result of the thermo-cutting. Hence even in the absence of physical contact, the radiation from the successive sealing loops 98 will increase the depth of the fused joint in the manner shown in FIG. 10.

Preferably, the waste material is discharged on a different path from the path of discharge of the sealed workpieces and the deflection of the waste conveying belts as they pass through the discharge pulleys 76, 77 is in a direction such that when the table is adjusted from the dotted line position to the full line position illustrated in FIG. 6, the waste will be discharged downwardly beneath the table.

An incidental advantage of the structure disclosed consists in the fact that the motor 80 acts as a counterweight for the conveyor and cutoff and heat sealing

We claim:

1. A heating unit for use on relatively movable workpieces in apparatus of the character described, said unit comprising a convoluted resistance wire having forwardly and rearwardly extending loops aligned in the direction of relative workpiece movement, supporting means connected with certain of the rearwardly extending loops and between which substantially all of the rest of the wire is exposed, the forwardly projecting loops comprising work contacting means and the remainder of the wire comprising a heat reservoir for delivery of heat to said means.

2. The combination with means for feeding on a predetermined path workpieces comprising heat fusible material, of means disposed along said path for fusing such material and including a convoluted resistance wire having a series of loops projecting into the path of such material and having intervening rearwardly projecting loops, taps connected with certain of the rearwardly projecting loops and provided with electrical connection for energizing the forwardly projecting loop therebetween, and means to which said taps are physically connected for the support of said wire.

3. The device of claim 2 in which the forwarly projecting loops are arcuate and the paths upon which the work is advanced is substantially tangent thereto whereby said loops are substantially limited to point contact with said material, other portions of said wire between said taps being free and constituting heat reservoir means from which heat is delivered to said points to maintain the temperature thereof at a work fusing value.

4. A machine for sealing heat sealable material of workpieces such as bags and the like, said machine comprising means for advancing said workpieces on a predetermined path, a resistance wire having means spaced at intervals for its support and having resistance-heated loop portions in a common plane along said path and projecting at intervals from said means toward said path into positions to be successively engaged superfically by said material, and means for passing current through selected portions of said wire for raising successive loops thereof to a temperature sufficient for the cumulative effect thereof to fuse said material.

5. A device for severing waste and sealing fusible material projecting from successive workpieces, said device including means for advancing the workpieces on a predetermined path, heating elements spaced along said path and disposed in alignment on the course of a given portion of said material for acting successively upon said material, means for varying the total cumulative heating effect of said elements on corresponding portions of the respective workpieces and heat reservoir means with which the heating elements are connected, the heating elements having low mass work contacting portions.

6. The device of claim 5 in which said heating elements comprise successive forwardly projecting loops of convoluted resistance wires, the path of workpiece advance being substantially tangent to said loops and the loops being aligned in a common plane along said path, the wires having rearwardly directed loops intervening between certain of said forwardly projecting loops and which have current supply taps connected therewith and provided with mechanical supporting means.

7. The device of claim 6 in further combination with pressure means having a surface movable with the workpieces for compacting the fused material and abstracting heat therefrom to set such material.

8. A device for severing waste and sealing fusible material projecting from successive workpieces, said device including means for advancing the workpieces on a predetermined path, heating elements spaced along said path and disposed in alignment on the course of a given portion of said material for acting successively upon said material, means for varying the total cumulative heating effect of said elements on corresponding portions of the respective workpieces, the heating elements having the cumulative effect of severing waste from the workpieces and the means for advancing workpieces comprising clamping conveyor runs engaged with the material of successive workpieces and beyond which waste portions of such material project, and supplemental clamping conveyor runs engaged with projecting waste portions of such material, said resistance elements being disposed between the waste conveyor runs and the workpiece conveyor runs.

9. The device of claim 8 in further combination with means for deflecting the waste clamping conveyor runs laterally away from the path of the workpiece conveyor runs whereby waste is discharged in a position laterally offset from the path of the workpieces.

10. The combination with a tiltable table and means supporting it for pivotal movement between generally horizontal and generally upright positions, of heat sealing means mounted on the table to partake of its pivotal movement, conveyor belts having means for supporting said belts from the table to partake of the pivotal movement thereof, said belts having runs for clampingly engaging material projecting from successive workpieces for holding such material during operation of the heat sealing means thereon, said runs being disposed side by side in the horizontal position of the table to hold the workpieces dependent therefrom, and being superimposed in the upright position of the table to hold the workpieces in positions projecting laterally therefrom, and an auxiliary conveyor having guide means for fixing the position of the auxiliary conveyor laterally adjacent the said runs in the upright position of the table for supporting workpieces projecting laterally from said runs when the table is in its said substantially upright position.

11. A device of the character described for operating on successive workpieces of heat sealable material without smoking or sticking, said device comprising a succession of low mass heating elements disposed along the path of successive workpieces and in positions for successive contact therewith, said elements being heated to temperatures such that their cumulative action produces the desired effect on the successive workpieces.

12. A device according to claim 11 in further combination with work-clamping means spaced laterally at opposite sides of said succession of heating elements in a plane from which said elements are offset, and means including said elements for deflecting and concurrently heating work clamped by said work-clamping means.

13. In a device for severing waste portions from heat fusible material projecting from successive workpieces, the combination with a workpiece conveyor comprising conveyor belts having opposed clamping runs, and backing means for holding said runs engaged with the material of successive workpieces and beyond which runs such material projects, separate waste conveyor means comprising belts having opposed clamping runs positioned to engage waste portions of such material projecting from successive workpieces, and means between the workpiece conveyor belts and the waste conveyor belts for severing waste from the material of said workpiece, the waste severing means comprising a succession of heating elements of low mass having rounded work contacting surfaces projecting somewhat beyond the plane of the material as clamped between the first and second sets of clamping belts, whereby such material is deflected intermediate the sets of belts preliminarily to the severance thereof.

14. The device of claim 13 in which said elements comprise a resistance wire convoluted and provided with a series of loops aligned in a common plane parallel to the path of workpiece conveyor movement and having means for passing electricity through them for raising them to a temperature appropriate for the fusing of such material, said loops providing said rounded surfaces and acting sequentially upon said material to raise its temperature to the point of fusion for the severance of the waste and the fusing of the material of the workpiece to close it.

15. In a machine for closing heat fusible wrapping material of successive workpieces and for severing waste from such material, the combination with a workpiece conveyor having material clamping runs and backing means for supporting said runs for holding the material of the workpiece closed, with waste portions of such material projecting therefrom, a pair of waste clamping conveyor belts having runs parallel to and spaced away from the path of movement of workpieces with the first mentioned conveyor runs and having backing means for holding the waste engaging runs in clamping engagement with the waste of successive workpieces, deflecting guides for the waste engaging runs of the waste conveyor means, about which the waste engaging runs operate divergently from the path of the first mentioned runs after first operating in substantial parallelism therewith, and means for severing waste material from the material of said workpieces during the parallel operation of the respective conveyor means, said severing means comprising a succession of resistance wire loops spaced along the first mentioned runs and aligned along the path of workpiece movement for severing the waste and for subsequently heat sealing remaining margins of the material of said workpieces.

References Cited in the file of this patent

UNITED STATES PATENTS

| | | |
|---|---|---|
| 751,527 | Marr | Feb. 9, 1904 |
| 1,339,736 | Burke | May 11, 1920 |
| 2,387,566 | Custers | Oct. 23, 1945 |
| 2,410,834 | Messer | Nov. 12, 1946 |
| 2,635,673 | Hakomaki | Apr. 21, 1953 |
| 2,697,473 | Techtmann | Dec. 21, 1954 |
| 2,711,779 | Carland | June 28, 1955 |
| 2,913,863 | Sylvester | Nov. 24, 1959 |
| 2,990,875 | Samuels | July 4, 1961 |

FOREIGN PATENTS

| | | |
|---|---|---|
| 540,169 | Canada | Apr. 30, 1957 |